United States Patent [19]

Laffoon et al.

[11] 4,074,145
[45] Feb. 14, 1978

[54] ELECTRIC POWER GENERATING APPARATUS

[76] Inventors: Perry D. Laffoon, 21 Janice, Yukon, Okla. 73099; Robert L. Boettcher, 7225 Norman Road, Oklahoma City, Okla. 73132

[21] Appl. No.: 788,524

[22] Filed: Apr. 18, 1977

[51] Int. Cl.² .............................................. H02J 3/00
[52] U.S. Cl. ................................ 307/10 R; 290/40 R
[58] Field of Search ........................ 307/10 R; 290/40

[56] References Cited

U.S. PATENT DOCUMENTS

| | | | |
|---|---|---|---|
| 3,497,709 | 2/1970 | Chilton et al. | 307/10 R |
| 3,553,473 | 1/1971 | Meeks | 290/40 |
| 3,660,671 | 5/1972 | Peterson | 307/10 R X |
| 3,676,694 | 7/1972 | Schneider et al. | 307/10 R |
| 3,681,611 | 8/1972 | Watson | 307/10 R |
| 3,761,727 | 9/1973 | Santilli | 290/40 |
| 3,770,976 | 11/1973 | Stroud et al. | 307/10 R |
| 3,824,404 | 7/1974 | Ghere | 307/10 R |
| 3,845,321 | 10/1974 | Santilli | 290/40 |
| 3,894,242 | 7/1975 | Helling | 307/10 R |
| 3,953,740 | 4/1976 | Seiter | 307/10 R |

*Primary Examiner*—William M. Shoop
*Attorney, Agent, or Firm*—Dunlap, Codding & McCarthy

[57] ABSTRACT

An electric power generator incorporating an automobile alternator operable in a high voltage mode suitable for providing power for hand power tools and in a low voltage mode suitable for maintaining the charge of a battery which provides a field current for the alternator. A switching circuit, manually or automatically actuable to place the generator in the high voltage mode of operation, interposes a voltage regulator in the field current circuit and connects the output of the alternator to the battery to charge the battery when the generator is operated in the low voltage mode and interposes a variable resistor in the field current circuit and disconnects the battery from the output of the alternator to permit adjustment of the output voltage of the alternator when the generator is operated in the high voltage mode.

14 Claims, 3 Drawing Figures

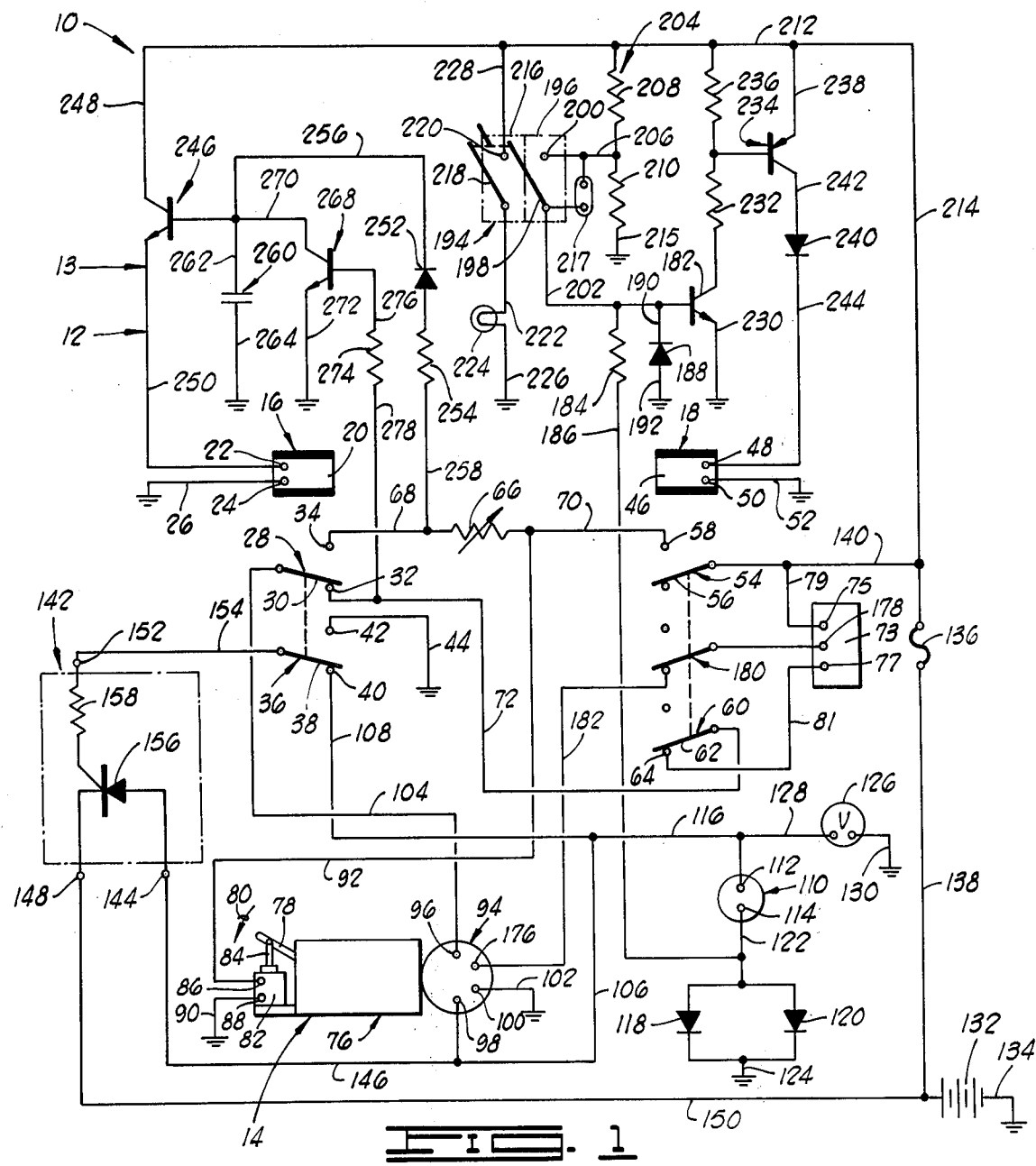
FIG. 1
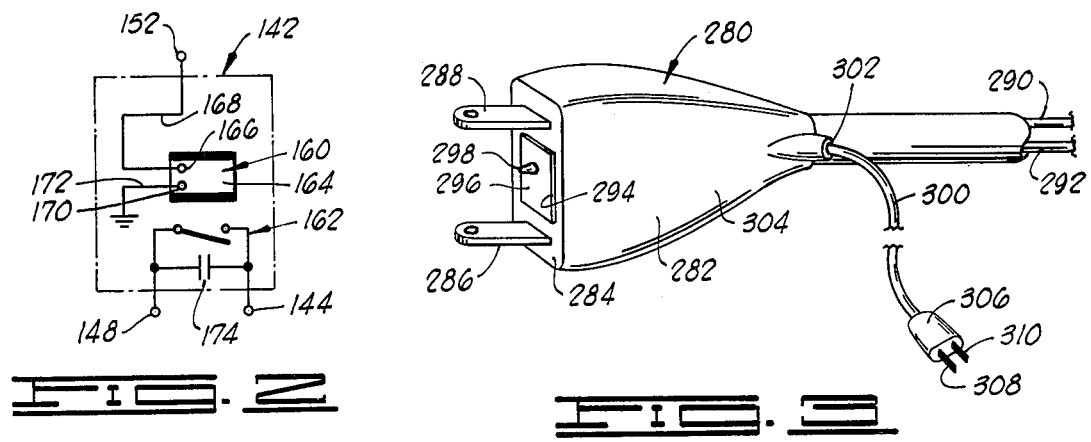
FIG. 2
FIG. 3

ELECTRIC POWER GENERATING APPARATUS

BACKGROUND OF THE INVENTION

1. Field of the Invention

The present invention relates to apparatus for generating electric power, and, more particularly, but not by way of limitation, to generating apparatus incorporating an automobile alternator as the power source.

2 Description of the Prior Art

In many parts of the world electric power is not readily available so that persons working in such areas must often take electric power generating apparatus to a job site in order to efficiently carry out such simple tasks as drilling a hole in a piece of metal or welding two pieces of metal together. Such generating apparatus will often be called upon to operate a variety of tools, each having its own power requirements which may, or may not, coincide with the requirements of other tools used at the site. Because of this variety, it is desirable that the generating apparatus be provided with a simple mechanism for adjusting the electrical characteristics of the power generated thereby to match the needs of the various tools at the job site.

It is also desirable that the generating apparatus incorporate parts which are interchangeable with other equipment likely to be found at a remote job site so that, if necessary, the generating apparatus may be maintained in operation by using repair parts provided for such other equipment. Skilled labor is often available at such sites only at a premium so that overseas supply of repair parts is to be avoided where possible. A piece of other equipment which usually accompanies workers to remote areas is a vehicle such as a truck or automobile.

It is known that the alternator found in the electrical system of a vehicle is capable of generating a voltage of sufficient amplitude to operate hand held power tools and that such an alternator is capable of providing power suitable for welding. For example, U.S. Pat. Nos. 3,761,727 and 3,845,321, issued to Santilli on Sept. 25, 1973 and Oct. 29, 1974 respectively, illustrate the use of a motor vehicle electrical system as a source of power for electrically driven hand tools. Such a capability is built into the alternator to permit the alternator to charge the vehicle battery at low speed operation of the vehicle engine which drives the alternator. As is well known, the electromotive force generated in an alternator or generator winding depends both upon the strength of a magnetic field relative to which the winding is rotated, either by rotating the winding or the source of the magnetic field, and to the rate of rotation. Thus, if the alternator is to be capable of generating a voltage sufficient to charge the vehicle battery when driven at a low speed, it will be capable of generating a higher voltage when driven at a higher speed. Such higher voltages are not desirable if the alternator is to be used for no purpose other than charging the battery and are prevented from occurring by using an electric current, referred to herein as a field current, to establish the magnetic field relative to which the winding or windings connected to the alternator output are rotated. The field current is supplied by the vehicle battery via a voltage regulator which varies the field current as the engine speed is increased or decreased to offset changes in the speed at which the alternator is driven with opposing changes in the magnetic field.

SUMMARY OF THE INVENTION

The present invention provides an electric power generating apparatus which incorporates an automobile type alternator driven by an auxiliary power unit such as a gasoline or diesel engine. In one mode of operation of the apparatus, a battery supplies a field current to the alternator via an automobile type voltage regulator so that the output voltage thereof is suitable for maintaining the battery, connected to the output of the alternator in this mode of operation, in a charged state. In a second mode of operation, the field current is applied to the alternator via a variable resistor permitting the amplitude of the output voltage of the alternator to be varied to match the job the alternator is required to perform. A switching circuit is provided to alternatively place the generating apparatus in the first and second mode of operation and several means are provided for actuating the switching circuit.

An object of the present invention is to provide an electric power generating apparatus having an adjustable output permitting the apparatus to be used for a variety of purposes.

Another object of the invention is to provide an electric power generating apparatus which incorporates automotive vehicle electrical components.

A further object of the invention is to provide an electric power generating apparatus, using an automotive vehicle alternator as a power source, with a variable resistor to vary the field current in the alternator whereby the output voltage of the alternator is adjusted to match external power requirements.

A still further object of the invention is to provide an electric power generating apparatus having a switching circuit for placing the apparatus in one mode of operation suitable for charging a battery and in a second mode of operation suitable for operating power tools.

Yet another object of the invention is to provide an electric power generating apparatus with a number of switching mechanisms for alternatively placing the apparatus in either of two modes of operation.

Other objects, advantages and features of the present invention will become clear from the following detailed description of the preferred embodiment of the invention when read in conjunction with the drawings and appended claims.

BRIEF DESCRIPTION OF THE DRAWINGS

FIG. 1 is a schematic of the electric power generating apparatus including a charging circuit incorporating a silicon controlled rectifier.

FIG. 2 is a schematic of an alternative charging circuit.

FIG. 3 shows a power plug assembly providing an alternative switching mechanism for the generating apparatus.

DESCRIPTION OF THE ELECTRIC POWER GENERATING APPARATUS

Referring now to FIG. 1, shown therein and designated by the general reference number 10 is a schematic of an electric power generating apparatus constructed in accordance with the present invention. The electric power generating apparatus 10 generally includes a switching assembly 12 and a power assembly 14.

The switching assembly 12 includes a switching circuit 13, which will be described hereinbelow. The switching circuit 13 includes a first relay 16 and a second relay 18 and the switching circuit 13 may be placed in a first state, wherein the relays 16, 18 are deactuated to place the electric power generating apparatus 10 in a low voltage mode of operation, and the switching circuit may be placed in a second state, wherein the relays 16, 18 are actuated to place the electric power generating apparatus in a high voltage mode of operation.

The first relay 16 has a coil 20, having an input terminal 22 and a ground terminal 24, connected via conductor 26 to a system ground, such that the first relay 16 is actuable by introducing an electric current into the first terminal 22 of the coil 20. The first relay 16 is provided with a first relay first contact assembly 28 having an armature 30, closed with a terminal 32 in the deactuated condition of the first relay 16 and closed with a terminal 34 in the actuated condition thereof, and a first relay second contact assembly 36 having an armature 38, closed with a terminal 40 in the deactuated condition of the first relay 16 and closed with a terminal 42 in the actuated condition of the first relay 16. Terminal 42 is connected to the system ground via a conductor 44.

The second relay 18 has a coil 46 having an input terminal 48 and a ground terminal 50, connected to the system ground via conductor 52, such that the second relay 18 may be placed in the actuated condition by introducing an electric current in the terminal 48. The second relay 18 is provided with a second relay first contact assembly 54 having an armature 56, which is closed with a terminal 58 when the second relay 18 is in the actuated condition and a second relay second contact assembly 60 having an armature 62 which is closed with a terminal 64 when the second relay 18 is in the deactuated condition.

Terminal 34 of the first relay first contact assembly 28 is connected through variable resistor 66 to terminal 58 of the second relay first contact assembly 54 via conductors 68 and 70, and terminal 32 of the first relay first contact assembly 28 is connected, via a voltage regulation conduit 72, to the armature 62 of the second relay second contact assembly 60.

The switching assembly 12 further comprises a voltage regulator 73 having an input terminal 75 and an output terminal 77. The input terminal 75 of the voltage regulator 73 is connected to the armature 56 of the second relay first contact assembly 54 via a conductor 79, and the output terminal 77 of the voltage regulator 73 is connected to the terminal 64 of the second relay second contact assembly 60 via a conductor 81.

The power section 14 comprises an auxiliary power unit 76, represented schematically in FIG. 1. In one embodiment of the electric power generating apparatus 10, the auxiliary power unit is a gasoline powered internal combustion engine. The auxiliary power unit 76 is provided with a throttle 78, which may be placed in a first position, wherein the auxiliary power unit operates at low speed, and moved in advancing direction 80 to a second position in which the auxiliary power unit operates at high speed. The throttle 78 is connected to a solenoid 82 via a linkage 84 such that actuation of the solenoid 82 will move the throttle 78 in the advancing direction 80 to increase the rate at which the auxiliary power unit 76 operates. The solenoid 82 has an input terminal 86 and a ground terminal 88, connected to the system ground via a conductor 90, such that the solenoid 82 may be actuated by introducing an electric current into the input terminal 86 thereof. The input terminal 86 of the solenoid 82 is connected via a conductor 92 to terminal 58 of the second relay first contact assembly 54.

The auxiliary power unit 76 is mechanically coupled to an automobile type alternator 94 by means which are well known in the art and need not be discussed herein. The alternator 94 has an input terminal 96, an output terminal 98, and a ground terminal 100, connected to the system ground via a conductor 102. The alternator 94 is driven by the auxiliary power unit 76 to generate electric power when a field current is introduced into the input terminal 96 and passes through an input circuit (not illustrated) to the ground terminal 100 and, thence, to the system ground. The alternator 94 has an output circuit (also not illustrated) which produces a fluctuating electromotive force between the output terminal 98 and the ground terminal 100 with the sense of the electromotive force being such that the output terminal 98 is positive with respect to the system ground.

The input terminal 96 is connected via a conductor 104 to the armature 30 of the first relay first contact assembly 28 and the output terminal 98 is connected via conductors 106 and 108 to terminal 40 of the first relay second contact assembly 36.

The power assembly 14 further comprises an electrical outlet 110 having a first terminal 112 and a second terminal 114. In the preferred embodiment the outlet 110 is an electrical receptacle of the type commonly found in households for connecting appliances, tools, and the like to the electrical supply thereof provided by public utilities. The first terminal 112 is connected to the output terminal 98 of the alternator 94 via a conductor 116 and the conductor 106. The second terminal 114 is connected to the anodes of a diode pair 118 and 120 via a conductor 122 and the cathodes of the diodes 118 and 120 are connected to the system ground via a conductor 124. An electrical load, such as a power tool, is connected to the electric power generating apparatus 10 by plugging the load into the outlet 110 in the usual manner. Since the output terminal 98 of alternator 94, connected to the first terminal 112 as previously described, is positive with respect to the system ground, the diode pair 118, 120 provide a conducting path between the second terminal 114 so that very nearly the entire electromotive force developed in the alternator 94 is impressed across a load connected to the outlet 110. The purpose for interposing the diode pair 118, 120 between the load and the system ground will be discussed below.

It is expected that the electric power generating apparatus 10 will be used to supply power for various loads having various power requirements and, as will be discussed below, the electric power generating apparatus 10 is constructed such that the output voltage thereof is adjustable. As an aid to adjustment thereof, the electric power generating apparatus 10 is provided with a voltmeter 126 connected to the first terminal 112 of the outlet 110 via a conductor 128 and connected to the system ground via a conductor 130.

The power assembly 14 further comprises a battery 132, the cathode of which is connected to the system ground via a conductor 134. The anode of the battery 132 is connected through a fuse 136 to the armature 56 of the second relay first contact assembly 54 and to the input terminal 75 of the voltage regulator 73 via the conductors 138 and 140.

As will be discussed in more detail below, the battery 132 provides the field current to the alternator 94 necessary for operation of the alternator 94. To maintain the battery 132 in a charged condition, the power assembly 14 is provided with a charging circuit 142, one form of which is shown in FIG. 1 and a second form of which is shown in FIG. 2. In either form, the charging circuit is provided with an input terminal 144, connected with the output terminal 98 of the alternator 94 via a conductor 146, and an output terminal 148 connected to the battery 132 via a conductor 150 so that the charging circuit provides a charging current to the battery when a conducting path is provided between the input and output terminals 144 and 148. A gating terminal 152 of the charging circuit 142 is connected with the armature 38 of the first relay second contact assembly 36 via a conductor 154.

The first form of the charging circuit 142, shown in FIG. 1, comprises an SCR 156, the anode of which is connected to the input terminal 144, the cathode of which is connected to the output terminal 148, and the gate of which is connected via a resistor 158 to the gating terminal 152. The SCR 156 is switched into an "on" state, wherein the power generated by the alternator 94 will charge the battery 132, by supplying a gating signal to gate terminal 152 and is switched into an "off" state, wherein the battery 132 is isolated from the output terminal 98 of the alternator 94 by grounding the gating terminal 152 of the charging circuit 142.

The second form of the charging circuit 142, shown in FIG. 2, uses a relay 160 having normally open contacts 162 connected to the input and output terminals 144, 148 to alternatively open and close a conducting path between the output terminal 98 of the alternator 94 and the anode of the battery 132. The coil 164 of the relay 160 has an input terminal 166, connected to the gating terminal 152 via a conductor 168, and a ground terminal 170 connected to the system ground via a conductor 172. As is the case with the first form of the charging circuit 142, the battery 132 will be charged with the second form of the charging circuit 142 when a gating signal is supplied to the gating terminal 152, which connects the output terminal 98 of the alternator 94 to the anode of the battery 132, by actuating the relay 160 to close contacts 162. In the absence of the gating signal, the relay 160 will be in a deactuated state wherein the contacts 162 are open and the anode of the battery 132 will be isolated from the output terminal 98 of the alternator 94. Thus, with either form of the charging circuit 142, the battery 132 may be placed in a charging condition by supplying a gating signal to the gating terminal 152 of the battery charging circuit 142 or may be isolated from the output terminal 98 of the alternator 94 by grounding the input terminal 152 of the charging circuit 142. A capacitor 174 is connected across the contacts 162 of the relay 160 to eliminate arcing when the contacts 162 are opened and closed while the alternator 94 is operating.

It will be recognized by those skilled in the art that different manufacturers of automobile alternators and regulators employ different designs therefor. In some designs, the alternator 94 is provided with an auxiliary terminal 176, and the voltage regulator 73, used therewith, includes an auxiliary terminal 178. When such alternators and regulators are used in the electric power generating apparatus 10, the second relay 18 is provided with a second relay third contact assembly 180 which, when the second relay 18 is in the deactuated state provides a conducting path between the auxiliary terminals 176, 178 of the alternator 94 and the voltage regulator 73 via a conductor 182.

The switching circuit 13 of the switching assembly 12 includes a switching transistor 182, of the npn type, the base of which is connected through resistor 184 to the anodes of diodes 118 and 120 via conductor 186. The cathode of a diode 188 is connected to the base of the switching transistor 182 via conductor 190 and the anode of diode 188 is grounded via a conductor 192. The switching assembly 12 further includes a double pole, single throw switch 194 having a first section 196. The first section 196 has a switch member 198 which may be closed with a terminal 200 to place the first section 196 of the switch 194 in a conducting state. The switch member 198 is connected to the base of the switching transistor 182 via a conductor 202 and the terminal 200 is connected to a voltage divider 204 via a conductor 206. The voltage divider 204, comprising resistors 208 and 210, is connected to a main power conductor 212 which, in turn, is connected via a conductor 214 to the fuse 136 and, thence, to the anode of battery 132 as has been previously described. The main power conductor 212 also provides a power source for components of the switching circuit 13. The resistor 210 of the voltage divider 204 is connected to the system ground via a conductor 215 so that the voltage divider 204 provides a voltage signal at the terminal 200 and, when the switch 194 is closed, transmits a switching signal to the base of the switching transistor 182. A jack 217 is connected between the terminal 200 and the switch member 198 to provide a second conducting path from the voltage divider 204 to the switching transistor 182 as will be further described hereinbelow.

The switch 194 has a second section 216 having a switch member 218 which may be closed with a terminal 220 to place the second section 216 of the switch 194 in a conducting state. The switch member 218 is connected, via a conductor 222 to one terminal of an indicator lamp 224, the other terminal thereof being connected to the system ground via a conductor 226, and the terminal 220 is connected via a conductor 228 to the main power conductor 212. Thus, when the switch 194 is closed, a switching signal is transmitted from the voltage divider 204 to the base of the switching transistor 182 and the transmission thereof is indicated by the indicator lamp 224.

As discussed hereinabove, the switching circuit 13, which will now be described, includes the switching transistor 182. The emitter of the switching transistor 182 is grounded via a conductor 230, and the collector thereof is connected through a resistor 232 to the base of a second relay power transistor 234 which is of the pnp type. The base of the second relay power transistor 234 is further connected, through a resistor 236 to the main power conductor 212. The emitter of the second relay power transistor 234 is connected via a conductor 238 to the main power conductor 212 and the collector of the second relay power transistor 234 is connected, through a diode 240, to the input terminal 48 of the second relay 18 via conductors 242 and 244. The collector of the second relay power transistor 234 is connected to the anode of the diode 240 to permit a current to flow from the second relay power transistor 234 to the coil 46 of the second relay 18 while protecting the second relay power transistor 234 from reverse voltages which may be induced in the coil 46 of the second relay 18.

It will be recognized by those skilled in the art that, since the second relay power transistor 234 is a pnp transistor, the base-emitter junction thereof will be forward biased for conduction of a collector current when the base thereof is at lower electrical potential than the emitter thereof. Thus, since a potential drop occurs across any current carrying resistor, the second relay power transistor 234 can be placed in a conducting state to actuate the second relay 18 by passing a current through resistor 236 which is connected between the main power conductor 212 and the base of the second relay power transistor 234. In the absence of such a current through resistor 236, both the base and emitter of the second relay power transistor 234 will be at the electrical potential of the main power conductor 212 and the second relay power transistor 234 will be in a nonconducting state so that the second relay 18 will be in a deactuated state.

The resistor 236 forms a portion of the load for the switching transistor 182 so that a current may be passed through resistor 236 by biasing the switching transistor 182 for conduction of a collector current. Since the switching transistor 182 is an npn transistor having a grounded emitter, transmission of a positive signal, with respect to ground, to the base thereof biases the switching transistor 182 for conduction of a collector current, such current passing through resistor 236 to bias the second relay power transistor 234 into a conducting state. Thus, the second relay 18 may be placed in the actuated state by transmitting a switching signal to the base of switching transistor 182 and may be placed in the deactuated state by transmitting a null signal to the base of switching transistor 182 (that is, by grounding the base of switching transistor 182).

The switching circuit 13 is further provided with a first relay power transistor 246, of the npn type, to actuate the first relay 16. The collector of the first relay power transistor 246 is connected, via conductor 248, to the main power conductor 212 and the emitter of the first relay power transistor 246, is connected, via conductor 250, to the input terminal 22 of the coil 20 of first relay 16. The base of the first relay power transistor 246 is connected, through a diode 252 and a biasing resistor 254, and through the variable resistor 66, to terminal 58 of the second relay first contact assembly 54, via conductors 256, 258 and 70. A capacitor 260 is connected, on one side thereof, to the base of the first relay power transistor 246 via conductor 262 and, on the other side thereof, to the system ground via conductor 264.

It will be recognized by those skilled in the art that, since the first relay 16 will require a minimum current for actuation, and since the first relay 16 is connected between the emitter of the first relay power transistor 246 and the system ground, the emitter of the first relay power transistor 246 will be at a relatively high potential with respect to ground when the relay 16 is in an actuated state. Thus, forward biasing of the base-emitter junction of the first relay power transistor 246 requires that the base thereof be maintained at a correspondingly, relatively high potential. The purpose of placing this requirement on the biasing potential of the base of the first relay power transistor 246 will be discussed more fully below.

The switching circuit 13 further comprises a positive turnoff transistor 268, of the npn type, the collector of which is connected to the base of the first relay power transistor 246 via a conductor 270. The emitter of the positive turnoff transistor 268 is connected to the system ground via a conductor 272, and the base thereof is connected through a resistor 274 to the voltage regulation conduit 72 via conductors 276 and 278.

Referring now to FIG. 3 shown therein is a power plug assembly 280 comprising a plug 282 having a forward face 284. The plug 282 is adapted for connection thereof to the outlet 110 in the usual manner; that is, prongs 286 and 288, extending from the forward face 284, are inserted into the terminals 112, 114 of the outlet 110 to support the plug assembly 280 on the outlet 110. This provides electrical contact between the terminals 112, 114 of the outlet and electrical conductors 290, 292 which are connected, within the body of the plug 282, to the prongs 286 and 288. Thus, an external electrical load may be connected to the electric power generating apparatus 10 by connecting the load to conductors 290, 292 and inserting the plug 282 into the outlet 110 in the usual manner.

A cavity 294 is formed in the forward face 284 of the plug 282, and a normally open push button switch 296 is secured within the cavity 294. The construction of normally open push button switches is well known and need not be discussed herein. It suffices to note that such switches include a push button which may be depressed to close the contacts thereof so that the switch will conduct an electric current. The switch 296 is disposed within the cavity 294 such that the push button 298 thereof extends away from the face 284 of the plug 282 substantially parallel to the prongs 286, 288. The length of the push button 298 is such that, when the plug assembly 280 is connected to the outlet 110 in the usual manner, the push button 298 will engage portions of the outlet 110 and be depressed thereby to close the switch 296. A two-conductor electrical cord 300 is connected to the terminals (not shown) of the switch 296 within the body of the plug 282. The plug 282 is provided with an opening 302 in one wall 304 thereof and the cord 300 passes through the opening 302. An auxiliary plug 306, having electrical connectors 308, 310 is connected to the cord 300 so that the conductors of the cord 300 connect the connectors 308, 310 to the terminals of the switch 296. The auxiliary plug 306 is adapted for connection to the jack 217 so that a conducting path between the voltage divider 204 and the base of the switching transistor 182 may be established by connecting the auxiliary plug 306 to the jack 217 and closing the switch 296 by depressing the push button 298 thereof.

OPERATION OF THE ELECTRIC POWER GENERATING APPARATUS

As has been previously noted, the electric power generating apparatus may be operated in either a high voltage mode, when the switching circuit 13 is placed in the second state to actuate relays 16, 28 thereof, or in a low voltage mode, when the switching circuit is placed in the first state to deactuate relays 16, 18 thereof. When the relays 16 and 18 are deactuated (that is, when the electric power generating apparatus 10 is operated in the low voltage mode), the electric power generated by the alternator 94 is used to maintain the battery 132 in a charged state as will now be described.

When the relays 16 and 18 are in the deactuated state, the first armature 30 of the first relay first contact assembly 28 is closed with terminal 32 thereof, and armature 62 of the second relay second contact assembly 60 is closed with terminal 64 thereof to provide a conducting path between the input terminal 96 of the alternator 94 and the output terminal 77 of the voltage regulator 73 via the voltage regulation conduit 72 and conductors 81 and 104. Since the input terminal 75 of the voltage regulator 73 is connected, via conductor 79, to the armature 56 of the second relay first contact assembly 54, which, as discussed above, is connected to the anode of the battery 132, deactuation of the first and second relays, 16 and 18 respectively, interposes the voltage regulator 73 between the input terminal 96 of the alternator 94 and the battery 132 so that the voltage regulator 73 controls the field current introduced into the input terminal 98 of the alternator 94. Thus, the voltage regulator 73 controls the amplitude of the output voltage of the alternator 94 in the same manner that the voltage regulator in an automobile controls the amplitude at the output voltage of the alternator therein. The input terminal 86 of the solenoid 82 is connected, via conductors 92, 68 and 70, to terminals 34 and 58 of the first relay first contact assembly 28 and the second relay first contact assembly 54 respectively, which terminals are opened when the relays 16 and 18 are deactuated, so that the solenoid 82 is in a deactuated state. The linkage 84 is adjusted such that, when the solenoid 82 is in a deactuated state, the throttle 78 will be in the first position thereof, wherein the auxiliary power unit 76 operates at low speed to drive the alternator 94 at a rate sufficient only to charge the battery 132, whereby the fuel used to operate the auxiliary power unit 76 is conserved.

In the deactuated state of the first relay 16, the first relay second contact assembly 36 and conductors 106, 108 and 154 provide a conducting path for a gating signal from the output terminal 98 of the alternator 94 to the gate terminal 152 of the charging circuit 142. The gating signal switches the charging circuit 142 to a conducting state to connect the battery 132 to the output terminal 98 of the alternator 94 so that, in the low voltage mode of operation of the electric power generating apparatus 10, the alternator 94 changes the battery 132. Thus, the alternator 94 is driven at a speed sufficient to charge the battery 132 without wasting fuel; the voltage regulator 73 controls the amplitude of the output voltage of the alternator 94 to maintain such amplitude at a value suitable for charging the battery 132; and the charging circuit 142 conducts the electrical power generated by the alternator 94 to the anode of the battery 132. The result is that, in the low voltage mode of operation of the electric power generating apparatus 10, the alternator 94 is used to maintain the battery 132 in a charged condition while consuming a minimum of fuel.

When the electric power generating apparatus 10 is caused to operate in the high voltage mode, by placing the switching circuit 13 is the second state to actuate the relays 16 and 18, it is usually desirable to increase the amplitude of the output voltage of the alternator 94 to permit the electrical power generated thereby to be used to operate power tools, electric lights, and the like. The throttle 78 of the auxiliary power unit 76 has been deliberately positioned to provide the auxiliary power unit 76 with a low operating speed when the electric power generating apparatus 10 is operated in the low voltage mode, and the throttle 78 is advanced when the electric power generating apparatus 10 is switched to the high voltage mode of operation. The advance of the throttle 78 is carried out automatically, upon switching of the electric power generating apparatus 10 from the low voltage mode to the high voltage mode, by the solenoid 82. When the second relay 18 is actuated, armature 56 of the second relay first contact assembly 54, which is connected via fuse 136 and conductors 140 and 138 to the anode of the battery 132, contacts terminal 58, which is connected via conductors 70, 92 to the input terminal 86 of the solenoid 82 to conduct an actuating current to the solenoid 82, thereby actuating the solenoid 82 to move the throttle 78 to the second position thereof.

Since the voltage regulator 73 is designed to control the amplitude of the output voltage of the alternator 94 despite increases in the rate in which the alternator 94 is driven, the voltage regulator 73 is disconnected from the input terminal 96 of the alternator 94 when the electric power generating apparatus 10 is switched to the high voltage mode of operation, and an alternative path for a field current to the input terminal 96 is established. The voltage regulator 73 is disconnected from the input terminal 96 when contact between terminal 64 and armature 62 of the second relay second contact assembly 60 is broken by actuation of the second relay 18 and contact between terminal 32 and armature 30 of the first relay first contact assembly 28 is broken by actuation of the first relay 16. The alternative path for the field current is established by closing armature 30 of the first relay first contact assembly 28 with terminal 34 thereof and by closing armature 56 of the second relay first contact assembly 54 with terminal 58 thereof whereby a conducting path is established, through variable resistor 66, between the input terminal 96 of the alternator 94 and the anode of the battery 132 via the first relay first contact assembly 28, the second relay first contact assembly 54 and conductors 104, 68, 70, 140 and 138. Thus, when the relays 16 and 18 are actuated, the input terminal 96 is connected to the anode of the battery 132 with the variable resistor 66 interposed therebetween. The strength of the field current supplied the input terminal 96 of the alternator 94 by this alternative path may be conveniently varied, to adjust the amplitude of the output voltage of the alternator 94, by adjusting the variable resistor 66. Guidance for adjusting the variable resistor 66 is provided by the volt meter 126 as has been previously described.

When the alternator 94 and the voltage regulator 73 include auxilliary terminals 176 and 178, respectively, actuation of the second relay 18 opens the second relay third contact assembly 180 to disconnect the auxilliary terminal 176 of the alternator 94 from the auxilliary terminal 178 of the voltage regulator 73.

Since, in the high voltage mode of operation, the amplitude of the output voltage of the alternator 94 is usually of such a magnitude that the battery 132, if left connected to the output terminal 98 of the alternator 94, would draw large currents capable of damaging the battery 132 or the alternator 94, the charging circuit 142 isolates the battery 132 from the alternator output terminal 94 when the electric power generating apparatus 10 is switched to the high voltage mode of operation. When the first relay 16 is actuated, armature 38 of the first relay second contact assembly 36 thereof breaks contact with terminal 40 and makes contact with terminal 42 to ground the gating terminal 152 of the charging circuit 142, thereby disrupting the connection between the output terminal 98 of the alternator 94 and the anode of the battery 132 as has been previously described.

Thus, when the relays 16 and 18 are actuated to switch the electric power generating apparatus 10 into the high voltage mode, the speed of the auxiliary power unit 76 is increased to drive the alternator 94 at a rate sufficient to generate electricity having a voltage amplitude sufficient to operate power tools and the like, the variable resistor 66 is interposed in the source of the field current supplied to the input terminal 96 of the alternator 94 to permit adjustment of the output voltage amplitude, and the battery 132 is isolated from the output terminal 98 of the alternator 94. The electric power generated by the alternator 94 in this mode of operation is made available at the outlet 110 by means of the electrical connection between the input terminal 112 thereof and the output terminal 98 of the alternator via conductors 106 and 116.

The switching circuit 13 may be switched into the second state to place the electric power generating apparatus 10 in the high voltage mode of operation in three ways, generally referred to herein as demand switching, manual switching and plug switching. Since, as will be discussed below, each mode of switching will initiate the same chain of events, demand switching will be described in detail while manual switching and plug switching will be described only to the point of initiation of the chain of events terminating with the completion of the transition from the low voltage mode to the high voltage mode.

Demand switching of the electric power generating apparatus 10 from the low voltage mode to the high voltage mode is carried out by turning on a load, such as a power tool, electric light, or the like, connected to the electric power generating apparatus 10 at the outlet 110. When the load is turned on, a current is drawn from the output terminal 98 of the alternator 94, via conductors 106, 116 and input terminal 112 of the outlet 110, and passes through diode pair 118 and 120 to ground via terminal 114 of the outlet 110 and conductors 122 and 124. As is well known by those skilled in the art, a small potential difference exists across a forward biased diode in a conducting state so that the voltage at the anodes of diodes 118 and 120 will be raised to a value slightly higher than ground when the load is turned on. This voltage is impressed upon the base of the switching transistor 182, via the connection provided by resistor 184 and conductor 186 between the base of the switching transistor 182 and the anodes of diodes 118 and 120, causing the switching transistor 182 to turn on. As has been previously discussed, when the switching transistor 182 is turned on, a signal is supplied to the base of the second relay power transistor 234 to turn transistor 234 on, and, in turn, to actuate the second relay 18. When the second relay 18 is actuated, armature 56 of the second relay first contact assembly 54 makes with terminal 58 thereof to provide a conducting path, through variable resistor 66, resistor 254, and diode 252, from the anode of the battery 132 to the base of the first relay power transistor 246 via conductors 138, 140, 70, 258 and 256 and via fuse 136. Accordingly, the battery 132 transmits a signal to the base of the first relay power transistor 246 to cause the first relay power transistor 246 to conduct, whereby the first relay 16 is actuated. As has been discussed above, when both relays 16 and 18 are actuated, the electric power generating apparatus 10 operates in the high voltage mode.

The electric power generating apparatus 10 will return to the low voltage mode of operation (when demand switching is used to switch the electric generating apparatus 10 to the high voltage mode) when the load is turned off as will now be described. When the load is turned off, the current through the diode pair 118, 120 drops to zero so that the anodes thereof return to ground potential. Accordingly, a null signal is transmitted to the base of the switching transistor 182 to turn the switching transistor 182 off; that is, the base of the switching transistor 182 will be grounded via the connection therefrom to the anodes of diode pair 118, 120 such that the base-emitter junction of the switching transistor 182 is no longer forward biased and the switching transistor 182 will no longer be in a conducting state. As has been previously described, when the switching transistor 182 is turned off, there will be no electrical current in resistor 236 so that the second relay power transistor 234 becomes nonconducting, deactuating the second relay 18. When the second relay 18 is deactuated, armature 56 of the second relay first contact assembly 54 breaks with the terminal 58 thereof to remove the forward biasing signal transmitted therethrough to the base of the first relay power transistor 246. Thus the first relay power transistor 246 turns off to deactuate the first relay 16, thereby completing the transition to the low voltage mode of operation of the electric power generating apparatus 10.

The positive turn off transistor 268 is provided to insure that the second relay power transistor 246 turns off when the second relay 18 is deactuated. The base of the first relay power transistor 246 is connected via conductors 256, 258 and 68 to terminal 34 of the first relay first contact assembly 28 so that, when the first relay 16 is actuated, the base of the first relay power transistor 246 is connected via the first relay first contact assembly 28 and conductor 104 to the input terminal 96 of the alternator 94. Electrical noise generated in the input circuitry of the alternator 94, due to residual magnetization of components of the alternator 94, could prevent the first relay power transistor 246 from turning off even though the signal transmitted to the base thereof via the second relay 18 is interrupted. To prevent the second relay power transistor 246 from remaining on despite deactuation of the second relay 18, the positive turn off transistor 268 is turned on by an electrical signal transmitted to the base thereof from the output terminal 77 of the voltage regulator 73. When the second relay 18 is deactuated, armature 62 of the second relay second contact assembly 60 contacts terminal 64 thereof to connect the output terminal 77 of the voltage regulator 73 to the base of the positive turn off transistor 268 through resistor 274 and the voltage regulation conduit 72 via conductors 81, 278 and 276. When the positive turn off transistor 268 is turned on, noise signals from the input terminal 96 of the alternator 94 are divided between the positive turn off transistor 268 and resistor 274, which forms a load therefor, to reduce the magnitude of such signals at the collector of the positive turn off transistor 268 and, accordingly, at the base of the first relay power transistor 246, to a value only slightly above ground potential. Since, as has been previously described, positive biasing of the base-emitter junction of the first relay power transistor 246, when the current through the coil 20 of the first relay 16 is sufficient to maintain the first relay in an actuated state, requires a relatively high potential, turning the positive turnoff transistor 268 on drives the first relay power transistor 246 toward a condition wherein the base-emitter junction thereof would be reverse biased by the voltage drop across the first relay 16 when the first relay 16 conducts a current sufficient to actuate the first relay 16. Accordingly, turning the positive turnoff transistor 268 on turns the first relay power transistor 246 off, whereby the first relay 16 returns to a deactuated state to complete the transition of the electric power generating apparatus 10 to the low voltage mode of operation.

It will be noted by those skilled in the art that a single diode in the place of diodes 118, 120 would provide demand switching as above described. A diode pair has been used in order to permit the use of inexpensive automotive diodes, rather than a single high current, expensive diode, without unduly limiting the current delivery capabilities of the electric power generating apparatus 10.

Manual switching and plug switching of the electric power generating apparatus 10 from the low voltage mode to the high voltage mode is utilized when the electric power generating apparatus 10 is used for applications in which it is difficult to initiate a current through the load connected to the outlet 110 when the electric power generating apparatus 10 is in the low voltage mode of operation. Manual switching is carried out by using the switch 194 to provide an alternate source for a switching signal to the base of the switching transistor 182. When the switch 194 is closed, switching member 198, which is connected to the base of the switching transistor 182 via conductor 202, makes with terminal 200, which is connected to the voltage divider 204. Therefore, the closing of switch 194 transmits an electrical signal from the voltage divider 204 to the base of the switching transistor 182 to turn the switching transistor 182 on. Transition to the high voltage mode of operation then proceeds as previously described. Reversion to the low voltage mode is carried out by opening the switch 194 to permit a null signal to be transmitted to the base of the switching transitor 182 by the diode pair 118, 120 as previously described.

It will be noted that when the electric power generating apparatus 10 is operated in the high voltage mode, the battery 132 provides the field current for the operation of the alternator 94 and is not under charge by the alternator 94. Thus, the battery 132 is under a drain during operation in the high voltage mode and may be discharged if the switch 194 is left closed for a long period of time. When the switch 194 is closed, the indicator lamp 224 is turned on, as previously described, to bring this possibility to the attention of the operator of the electric power generating apparatus 10. This signals him to manually switch the electric power generating apparatus 10 to the low voltage mode of operation when the need for manually placing the electric power generating apparatus 10 in the high voltage mode no longer exists.

Plug switching is carried out by connecting the auxiliary plug 306 to the jack 217 and connecting the plug 282 to the outlet 110 in the usual manner of making such a connection. When the plug 282 is connected to the outlet 110, the push button 298 of the push button switch 296 engages portions of the outlet 110 and is depressed thereby to close the push button switch 296. Since the jack 217 is connected in parallel with the first section 196 of the switch 194, closing the push button switch 296, connected to the jack 217 via the cord 300 and auxiliary plug 306, connects the voltage divider 204 to the base of the switching transistor 182 in the same manner that closing the switch 194 connects the voltage divider 204 to the base of the switching transistor 182. Thus, the electric power generating apparatus 10 may be switched to the high voltage mode of operation by connecting the plug 282 to the outlet 110 and will return to the low voltage mode of operation when the plug 282 is disconnected from the outlet 110.

It is evident that the presently described invention provides an electric power supply which is easy to transport and simple to operate, and which incorporates readily available replacement parts. Also, it is evident that the other objects, advantages and features described hereinabove are fully met by the described invention. It will be recognized that changes may be made in the construction and arrangement of the parts or elements of the embodiment disclosed herein without departing from the spirit and scope of the invention as defined in the following claims.

What is claimed is:

1. An electric power generating apparatus comprising:

an outlet for connection to an electrical load;

an alternator, having an input terminal for receiving a field current, the alternator having an output terminal connected to the outlet for providing a voltage signal thereto in a driven condition of the alternator;

an auxiliary power unit, mechanically coupled to the alternator, for driving the alternator, the auxiliary power unit comprising a throttle positionable in a first position wherein the auxiliary power unit drives the alternator at a relatively low speed and positionable in a second position wherein the auxiliary power unit drives the alternator at a higher speed;

a solenoid, connected to the throttle of the auxiliary power unit and alternatively positioning the throttle in the first and second positions, the solenoid having an input terminal and a ground terminal, the input terminal receiving an actuating current and the ground terminal connected to a system ground;

a battery connected to the input terminal of the alternator and to the input terminal of the solenoid, the battery providing the field current to the alternator and providing the actuating current to the solenoid; and a switching assembly, interposed between the battery and the input terminals of the alternator and the solenoid, comprising:

a voltage regulator having an input terminal connected to the battery and an outlet terminal;

a voltage regulation conduit;

a variable resistor; and a switching circuit comprising:

a first relay having a first relay first contact assembly connected to the input terminal of the alternator, the resistor and the voltage regulation conduit, the first relay first contact assembly connecting the voltage regulation conduit to the input terminal of the alternator in a deactuated state of the first relay and connecting the resistor to the input terminal of the alternator in an actuated state of the first relay;

a second relay, comprising:

a second relay first contact assembly connected to the battery, the resistor, and the input terminal of the solenoid, the second relay first contact assembly connecting the battery to the resistor and to the input terminal of the solenoid in an actuated state of the second relay; and a second relay second contact assembly connected to the output terminal of the alternator and to the voltage regulator conduit, the second relay second contact assembly connecting the output terminal of the alternator to the voltage regulation conduit in a deactuated state of the second relay; and relay actuation means for alternatively placing the first and second relays in a deactuated state and placing the first and second relays in an actuated state.

2. An electric power generating apparatus as recited in claim 1 wherein the relay actuation means comprises:

a second relay power transistor connected to the second relay for placing the second relay in the actuated state in a conducting condition of the second relay power transistor;

a first relay power transistor connected to the first relay for placing the first relay in the actuated state in a conducting condition of the first relay power transistor, the base of the first relay power transistor connected to the second relay first contact assembly, the second relay first contact assembly further characterized as connecting the battery to the base of the first relay power transistor in the actuated state of the second relay to place the first relay power transistor in a conducting state, whereby the second relay is placed in the actuated state when the first relay is placed in the actuated state; and a switching transistor, connected to the base of the second relay power transistor for placing the second relay power transistor in a conducting state in response to a switching signal received at the base of the switching transistor;

and wherein the switching assembly further comprises:

a voltage divider connected to the base of the switching transistor for providing a switching signal; and switch means, interposed between the voltage divider and the base of the switching transistor for alternatively transmitting the switching signal to the base of the switching transistor and disrupting transmission of the switching signal thereto.

3. An electric power generating apparatus as recited in claim 2 wherein the switch means is characterized as being a plug assembly comprising:

a power plug connected in the mounted condition thereof to the outlet;

a normally open push button switch, supported by the power plug, the push button switch connected to the voltage divider and to the base of the switching transistor to transmit the switching signal therebetween in a closed condition of the push button switch, the push button switch having a push button engaging the outlet in the mounted position of the power plug to close the push button switch.

4. An electric power generating apparatus comprising:

an outlet for connecting an electrical load;

an alternator, having an input terminal for receiving a field current, connected to the outlet for providing a voltage signal in a driven condition of the alternator, the voltage signal having an amplitude proportional to the field current;

means for driving the alternator;

a battery connected to the input terminal of the alternator for providing the field current; and a switching assembly, interposed between the input terminal of the alternator and the battery, and comprising:

a voltage regulator;

a variable resistor; and a switching circuit, connected to the voltage regulator and the resistor, the switching assembly connecting the battery to the input terminal of the alternator via the voltage regulator in a first state of the switching circuit, whereby the electric power generating apparatus will operate in a low voltage mode, and the switching assembly connecting the battery to the input terminal of the alternator via the resistor in a second state of the switching circuit, whereby the electric power generating apparatus will operate in a high voltage mode wherein the voltage signal provided by the alternator is varied by adjusting the field current via a variation in the resistance of the resistor, the switching circuit being characterized as being responsive to a switching signal transmitted thereto to place the switching circuit in the second state thereof and responsive to the absence of a switching signal transmitted thereto to place the switching circuit in the first state thereof;

a voltage divider for generating a switching signal; and switch means, connected to the voltage divider and to the switching circuit, for alternatively transmitting the switching signal from the voltage divider to the switching circuit and disrupting transmission of the switching signal from the voltage divider to the switching circuit.

5. An electric power generating apparatus as recited in claim 4 wherein the switch means is characterized as being a plug assembly comprising:

a power plug connected in a mounted condition thereof to the outlet; and a normally open push button switch, supported by the power plug, the push button switch connected to the voltage divider and the switching circuit to transmit the switching signal therebetween in a closed condition of the push button switch, the push button switch having a push button engaging the outlet in the mounted condition of the power plug to close the push button switch.

6. An electric power generating apparatus as recited in claim 4 further comprising current sensing means, connected to the outlet and to the switching circuit, for transmitting a switching signal to the switching circuit in response to a current through the outlet.

7. An electric power generating apparatus as recited in claim 4 wherein the means for driving the alternator is characterized as having a throttle positionable in a first position wherein the driving means drives the alternator at a relatively low speed and positionable in a second position wherein the driving means drives the alternator at a higher speed, and wherein the electric power generating apparatus further comprises a solenoid connected to the throttle for placing the throttle in the second position in response to an actuating current and wherein the switching assembly further comprises means for transmitting an actuating current to the solenoid in the second state of the switching circuit.

8. The electric power generating apparatus of claim 4 wherein the alternator is characterized as having an output terminal connected to the outlet, wherein the electric power generating apparatus further comprises a charging circuit connected to the output terminal of the alternator and to the battery, the charging circuit characterized as comprising:

a gating terminal; and means, responsive to a gating signal supplied to the gating terminal for establishing a conductive path between the output terminal of the alternator and the battery, the means for establishing the conductive path being nonconducting when the gating terminal is connected to a system ground, and wherein the switching assembly comprises means for transmitting a gating signal to the charging circuit gating terminal in the first state of the switching circuit and for connecting the gating terminal to the system ground in the second state of the switching circuit.

9. An electric power generating apparatus as recited in claim 8 wherein the means for establishing a conductive path between the output terminal of the alternator and the battery is characterized as being an SCR, the anode of which is connected to the alternator output terminal, the cathode of which is connected to the battery, and the gate of which is connected to the gating terminal.

10. An electric power generating apparatus as recited in claim 8 wherein the means for establishing a conductive path between the alternator output terminal and the battery is characterized as being a relay comprising:
 a coil having one terminal connected to the system ground and another terminal connected to the charging circuit gating terminal; and
 a normally open contact assembly connected between the output terminal of the alternator and the battery.

11. An electric power generating apparatus comprising:
 an outlet for connecting an electrical load;
 an alternator, having an input terminal for receiving a field current, connected to the outlet for providing a voltage signal in a driven condition of the alternator, the voltage signal having an amplitude proportional to the field current;
 means for driving the alternator;
 a battery connected to the input terminal of the alternator for providing the field current; and
 a switching assembly, interposed between the input terminal of the alternator and the battery, and comprising:
  a voltage regulator;
  a variable resistor; and
  a switching circuit, connected to the voltage regulator and the resistor, the switching assembly connecting the battery to the input terminal of the alternator via the voltage regulator in a first state of the switching circuit, whereby the electric power generating apparatus will operate in a low voltage mode, and the switching assembly connecting the battery to the input terminal of the alternator via the resistor in a second state of the switching circuit, whereby the electric power generating apparatus will operate in a high voltage mode wherein the voltage signal provided by the alternator is varied by adjusting the field current via a variation in the resistance of the resistor, the switching circuit comprising:
   a first relay, comprising:
    a coil having an input terminal and a ground terminal, the ground terminal connected to a system ground; and
    a first relay first contact assembly, connected to the input terminal of the alternator, to the resistor and to the voltage regulator, the first relay first contact assembly connecting the voltage regulator to the input terminal of the alternator in the first state of the switching circuit and connecting the resistor to the input terminal of the alternator in the second state of the switching circuit;
   a first relay power transistor, the emitter of which is connected to the input terminal of the coil of the first relay and the collector of which is connected to the battery;
   a biasing resistor connected to the base of the first relay power transistor;
   a positive turnoff transistor, the emitter of which is connected to the system ground and the colllector of which is connected to the base of the first relay power transistor; and
   a second relay comprising:
    a second relay first contact assembly connecting the battery to the biasing resistor in the second state of the switching circuit; and
    a second relay second contact assembly connecting the base of the positive turnoff transistor to the voltage regulator in the first state of the switching circuit.

12. An electric power generating apparatus comprising:
 an outlet for connecting an electrical load;
 an alternator, having an input terminal for receiving a field current, connected to the outlet for providing a voltage signal in a driven condition of the alternator;
 means for driving the alternator;
 a battery connected to the input terminal of the alternator for providing the field current; and
 a switching assembly, interposed between the input terminal of the alternator and the battery, and comprising:
  a voltage regulator providing a path for the field current to the input terminal of the alternator;
  means for establishing an alternative path for the field current to the input terminal of the alternator;
  a switching circuit, connected to the voltage regulator and the means for establishing the alternative path for the field current, the switching assembly connecting the battery to the input terminal of the alternator via the voltage regulator in a first state of the switching circuit, whereby the electric power generating apparatus will operate in a low voltage mode, and the switching assembly connecting the battery to the input terminal of the alternator via the means for establishing the alternative path for the field current in a second state of the switching circuit, whereby the electric power generating apparatus will operate in a high voltage mode, the switching circuit being characterized as being responsive to a switching signal transmitted thereto to place the switching circuit in the second state thereof and responsive to the absence of a switching signal transmitted thereto to place the switching circuit in the first state thereof;
  a voltage divider for generating a switching signal; and
  switch means, connected to the voltage divider and to the switching circuit, for alternately transmitting the switching signal from the voltage divider to the switching circuit and disrupting transmission of the switching signal from the voltage divider to the switching circuit, the switch means being characterized as being a plug assembly comprising:
- a power plug connected in a mounted condition thereof to the outlet; and
- a normally open push button switch, supported by the power plug, the push botton switch connected to the voltage divider and the switching circuit to transmit the switching signal therebetween in a closed condition of the push button switch, the push button switch having a push button engaging the outlet in a mounted condition of the power plug to close the push button switch.

13. An electric power generating apparatus comprising:
- an outlet for connecting an electrical load;
- an alternator, having an input terminal for receiving a field current, connected to the outlet for providing a voltage signal in a driven condition of the alternator;
- means for driving the alternator;
- a battery connected to the input terminal of the alternator for providing the field current; and
- a switching assembly, interposed between the input terminal of the alternator and the battery, and comprising:
  - a voltage regulator providing a path for the field current to the input terminal of the alternator;
  - means for establishing an alternative path for the fluid current to the input terminal of the alternator; and
  - a switching circuit, connected to the voltage regulator and the means for establishing the alternative path for the field current, the switching assembly connecting the battery to the input terminal of the alternator via the voltage regulator in a first state of the switching circuit, whereby the electric power generating apparatus will operate in a low voltage mode, and the switching assembly connecting the battery to the input terminal of the alternator via the means for establishing the alternative path for the field current in a second state of the switching circuit, whereby the electric power generating apparatus will operate in a high voltage mode, the switching circuit comprising: a first relay, comprising:
    - a coil having an input terminal and a ground terminal, the ground terminal connected to a system ground; and
    - a first relay first contact assembly, connected to the input terminal of the alternator, to the means for establishing the alternative path for the field current and to the voltage regulator, the first relay first contact assembly connecting the voltage regulator to the input terminal of the alternator in the first state of the switching circuit and connecting the means for establishing the alternative path for the field current to the input terminal of the alternator in the second state of the switching circuit;
    - a first relay power transistor, the emitter of which is connected to the input terminal of the coil of the first relay and the collector of which is connected to the battery;
    - a biasing resistor connected to the base of the first relay power transistor;
    - a positive turnoff transistor, the emitter of which is connected to the system ground and the collector of which is connected to the base of the first relay power transistor, the positive turnoff transistor being characterized as being turned on by an electrical signal transmitted to the base thereof;
    - means for connecting the battery to the biasing resistor in the second state of the switching circuit; and
    - means for transmitting an electrical signal to the base of the positive turnoff transistor in the first state of the switching circuit.

14. An electric power generating apparatus as recited in claim 13 wherein the means for transmitting an electrical signal to the base of the positive turnoff transistor is characterized as being a relay contact assembly connected to the output terminal of the voltage regulator.

* * * * *